Patented Dec. 4, 1951

2,577,093

UNITED STATES PATENT OFFICE 2,577,093

METHOD OF CONTROLLING FUNGI BY MEANS OF AN ACYLAMIDO NAPHTHOQUINONE

Milton Silverman, Forest Hills, N. Y., assignor to Schieffelin & Co., New York, N. Y., a corporation of New York No Drawing. Application November 6, 1948, Serial No. 58,811

3 Claims. (Cl. 167—32)

This invention relates to a method of controlling or inhibiting the growth of fungi by treating them with an acylamido naphthoquinone, preferably a 2-acylamido-1,4-naphthoquinone. The method is particularly useful, for example, in the treatment of those fungus infections which are responsible for the condition in humans commonly known as ringworm of the scalp or skin.

For the purpose of inhibiting the growth of fungi, the treating agent may be applied to humans and other animals, and to plants, fabrics, and organic materials in general. Application may be directly by means of a solution of the agent or a liquid carrier therefor, or the agent may be in powder or other solid form. Spraying is an effective method of application.

As a specific example of the invention, 2-acetylamido-1,4-naphthoquinone was tested by the method of Schomberg and Kolmer, Arch. Derm. and Syph., vol. 6, p. 746 (1922), as modified by Keeney, Bull. Johns Hopkins Hospital, p. 420, Nov. 1943–Dec. 1944, and found to be superior to products hitherto employed for inhibiting the growth of fungi like *M. Audiouini, S. Schenkii, T. Purpureum, T. Gypseum, T. Interdigitale, E. Floccosum, A. Schoeleini, M. Lanosum,* and *C. Imminitis.*

The 2-acetylamido-1,4-naphthoquinone was prepared as described in Fieser's "Experiments in Organic Chemistry," 2nd edition, pages 283–8, 1941, D. C. Heath & Co. Other acylamido naphthoquinones, such as the propionylamido, butyrylamido, etc. naphthoquinones may, of course, be prepared in the same way by using an appropriate acylating agent.

In the light of the foregoing description, the following is claimed:

1. Method of inhibiting the growth of fungi which comprises treating the fungi with an acylamido naphthoquinone.
2. Method of inhibiting the growth of fungi which comprises treating the fungi with a 2-acylamido-1,4-naphthoquinone.
3. Method of inhibiting the growth of fungi which comprises treating the fungi with 2-acetylamido-1,4-naphthoquinone.

MILTON SILVERMAN.

REFERENCES CITED

The following references are of record in the file of this patent:

UNITED STATES PATENTS

| Number | Name | Date |
|---|---|---|
| 2,349,772 | ter Horst | May 23, 1944 |
| 2,396,665 | Ladd | Mar. 19, 1946 |

OTHER REFERENCES

Horsfall J. G., Fungicides & Their Action. Chronica Botanica Co., Waltham, Mass., 1945, page 156. (Copy in P. O. S. L.)

Kligman et al., The Journal of Investigative Dermatology, pp. 59–68, Feb. 1948.

Science News Letter, April 20, 1946, page 255.

Calwell et al., J. Bacteriology, vol. 51 (1946), pp. 659, 660, 670.

Vinet C. R. Societe de Biologie, Feb. 24, 1945, pp. 155–156.

Oster American Journal of Pharmacy, Oct. 1949, pp. 375–389.